(12) United States Patent
Eggen et al.

(10) Patent No.: US 7,947,783 B2
(45) Date of Patent: May 24, 2011

(54) POLYETHYLENE COMPOSITION FOR INJECTION MOULDING WITH IMPROVED STRESS CRACK/STIFFNESS RELATION AND IMPACT RESISTANCE

(75) Inventors: Svein Eggen, Langangen (NO); Katrin Nord-Varhaug, Porsgrunn (NO); Siw Bodil Fredriksen, Skien (NO)

(73) Assignee: Borealis Technology Oy, Porvoo (FI)

( * ) Notice: Subject to any disclaimer, the term of this patent is extended or adjusted under 35 U.S.C. 154(b) by 476 days.

(21) Appl. No.: 12/088,881

(22) PCT Filed: Oct. 6, 2006

(86) PCT No.: PCT/EP2006/009683

§ 371 (c)(1),
(2), (4) Date: May 29, 2008

(87) PCT Pub. No.: WO2007/042216

PCT Pub. Date: Apr. 19, 2007

(65) Prior Publication Data

US 2008/0224354 A1 Sep. 18, 2008

(30) Foreign Application Priority Data

Oct. 7, 2005 (EP) .................................... 05021885

(51) Int. Cl.
*C08L 23/04* (2006.01)
(52) U.S. Cl. ............ 525/240; 525/53; 526/65; 526/348; 264/454; 264/478
(58) Field of Classification Search ............ 526/65, 526/348; 525/53, 240; 264/454, 478
See application file for complete search history.

(56) References Cited

FOREIGN PATENT DOCUMENTS

| EP | 0 517 868 | 11/1995 |
|---|---|---|
| EP | 1 460 105 | 9/2004 |
| EP | 1 146 077 | 6/2006 |
| EP | 1 574 549 | 1/2007 |
| JP | 11 106574 | 7/1999 |
| WO | WO 96/18662 | 6/1996 |
| WO | WO 97/44371 | 11/1997 |
| WO | WO 00/22040 | 4/2000 |
| WO | WO 2004/007610 | 1/2004 |
| WO | WO 2004/048468 | 6/2004 |
| WO | WO 2004/048468 A1 * | 6/2004 |

OTHER PUBLICATIONS

Heino, E.L. et al., "*The influence of molecular structure on some rheological properties of polyethylene,*" Annual Transaction of the Nordic Rheology Society, vol. 3, 1995.
International Search Report for International Application No. PCT/EP2006/009683, Jan. 2007.
Heino, E.L. et al., "*Rheological characterization of polyethylene fractions,*" Theor. Appl. Rheol., Proc. Int. Congr. Rheol, 11$^{th}$ (1992) 1, 360-362.

* cited by examiner

*Primary Examiner* — Roberto Rabago
(74) *Attorney, Agent, or Firm* — Fay Sharpe LLP

(57) ABSTRACT

The present invention relates to a polyethylene composition wherein (i) the composition has an MFR$_2$ of 0.05 to 100 g/10 min, (ii) the environmental stress crack resistance ESCR measured in hours according to ASTM 1693, condition B and E-modulus EM measured according to ISO 527-2: 1993 in MPa satisfy the following relation: ESCR>−EM h/MPa+1150 h.

15 Claims, No Drawings

POLYETHYLENE COMPOSITION FOR INJECTION MOULDING WITH IMPROVED STRESS CRACK/STIFFNESS RELATION AND IMPACT RESISTANCE

The present invention relates to a polyethylene composition for shaped articles, especially injection and compression moulded articles, in particular for caps and closures, transport packaging, houseware and thin wall packaging applications. Furthermore, the present invention relates to an injection or compression moulded article comprising said composition and to the use of said composition for the production of an injection or compression moulded article.

Injection moulding may be used to make a wide variety of articles including articles having relatively complex shapes and a range of sizes. Injection moulding is, for instance, suited for the manufacture of caps and closures, and articles used in transportation packaging which often have a particular form suited to the objects which they carry. Examples of such articles include boxes, bins, pallets, pails, trays and crates. Furthermore, injection moulding is widely used to produce articles for houseware applications, such as sink bowls and drainers, mixing bowls, food containers and buckets, as well as to produce thin wall packaging articles such as open top plastic containers for frozen or fresh food or non-food applications like paint, adhesives, cosmetics and pharmaceuticals.

Injection moulding is a moulding process in which a polymer is melted and then filled into a mould by injection. During initial injection, a high pressure is used and the polymer melt is compressed. Thus, upon injection into the mould the polymer melt initially expands or "relaxes" to fill the mould. The mould, however, is at a lower temperature than the polymer melt therefore as the polymer melt cools, shrinkage tends to occur. To compensate for this effect, further polymer melt may be slowly injected into the mould. Thereafter the polymer melt is cooled further to enable the moulded article to be removed from the mould without causing deformation.

Important properties of the polymer to be injection moulded are its mechanical properties which, in turn, determine the properties of the final moulded article. In particular, the polymer must have good impact resistance, and, simultaneously, a good balance between environmental stress crack resistance ESCR (which e.g. is measured in terms of the bell test) and stiffness (which e.g. is measured in terms of the E-modulus). Of course, the polyethylene composition at the same time must have good processability, such as good flowability.

There remains a need for a polyethylene composition suitable for use in injection and compression moulding, in particular for caps and closure, transport packaging and houseware applications, which provides a combination of, on the one hand, excellent mechanical properties including excellent impact strength, stress crack resistance and stiffness as well as a good balance between these mechanical properties, and, on the other hand, good processability, including good flowability.

It is emphasized that although these properties at least in part are contrary to each other, e.g. high ESCR and high stiffness, to provide a polyethylene composition for injection moulding, each of them must be achieved.

The present invention is based on the finding that such a composition must contain a fraction, usually from 1 to 20 wt %, of a copolymer of ethylene with one or more types of alpha-olefin comonomers which has a comparatively high molecular weight, usually above 300,000 g/mol.

The present invention thus provides a polyethylene composition wherein
(i) the composition has an $MFR_2$ of 0.05 to 100 g/10 min,
(ii) the environmental stress crack resistance ESCR measured in hours according to ASTM 1693, condition B and E-modulus EM measured according to ISO 527-2: 1993 in MPa satisfy the following relation:

$$ESCR \geq -EMh/MPa + 1150h.$$

The polyethylene composition according to the invention has improved mechanical properties including an improved ESCR/stiffness relation. The E-modulus is a measure for the stiffness. At the same time, the composition has good impact strength and good processability.

Preferably, the ESCR in hours and the EM of the composition satisfy the following relation:

$$ESCR \geq -EMh/MPa + 1200h.$$

Furthermore, in a preferred embodiment, in the polyethylene composition
(iii) the Charpy impact strength CIS (23° C.) measured in $kJ/m^2$ according to ISO 179:2000 and the $MFR_2$ in g/10 min satisfy the following relation:

$$CIS \geq -12 \log(MFR_2/g/10min)kJ/m^2 + 21.6kJ/m^2.$$

Preferably, the CIS and the $MFR_2$ of the composition satisfy the following relation:

$$CIS \geq -12 \log(MFR_2/g/10min)kJ/m^2 + 22.6kJ/m^2,$$

more preferred:

$$CIS \geq -12 \log(MFR_2/g/10min)kJ/m^2 + 23.6kJ/m^2, \text{ and}$$

still more preferred:

$$CIS \geq -12 \log(MFR_2/g/10min)kJ/m^2 + 24.6kJ/m^2.$$

Furthermore, in a preferred embodiment in the polyethylene composition
(iv) the Charpy impact strength CIS (23° C.) measured in $kJ/m^2$ according to ISO 179:2000 and the flowability (FA) measured in terms of the spiral length in cm at a pressure of 1000 bar satisfy the following relation:

$$CIS \geq -0.5FA kJ/m^2/cm + 39 kJ/m^2.$$

This preferred embodiment of the polyethylene composition of the invention provides a material with an improved balance of impact strength, which is an important property for the final product, and flowability, which is especially important when producing the product by injection moulding.

Preferably, the CIS and FA of the composition satisfy the following relation:

$$CIS \geq -0.5FA kJ/m^2/cm + 40 kJ/m^2, \text{ and}$$

still more preferably $$CIS \geq 0.5FA kJ/m^2/cm + 41 kJ/m^2.$$

Further preferred, the polyethylene composition has a melt flow rate $MFR_2$ of at least 0.1 g/10 min, preferably of at least 0.3 g/10 min, more preferably at least 0.5 g/10 min, even more preferably of at least 0.8 g/10 min and most preferably above 1.0 g/10 min.

Furthermore, the composition preferably has an $MFR_2$ of 25 g/10 min or less, more preferably 15 g/10 min or less, still more preferably 10 g/10 min or less, and most preferably 5 g/10 min or less.

Still further, preferably the polyethylene composition has an ESCR measured according to the bell test of 150 h or more, more preferably of 200 h or more, and most preferably of 250 h or more In a preferred embodiment, the polyethylene composition comprises (A) a fraction of a copolymer of ethylene with one or more alpha-olefins, with a weight average molecular weight $M_w$ of 300,000 g/mol or more.

Where ever the term "molecular weight" is used herein, the weight average molecular weight is meant. By ethylene copolymer is meant a polymer the majority by weight of which, i.e. more than 50 wt %, derives from ethylene monomer units.

Preferably, the molecular weight $M_w$ of fraction (A) is 320,000 g/mol or more, still more preferably is 350,000 g/mol or more.

Preferably, the $M_w$ of fraction (A) is 1,000,000 g/mol or below, more preferably 800,000 g/mol or below, and most preferably 600,000 g/mol or below.

Furthermore, it is preferred that fraction (A) has a molecular weight distribution $M_w/M_n$ of 3 or higher, more preferably of 4 or higher, and most preferably of 5 or higher.

Still further, it is preferred that fraction (A) has a molecular weight distribution $M_w/M_n$ of 15 or lower, more preferably of 10 or lower.

The comonomer content in fraction (A) preferably is up to 15 mol %, more preferably up to 10 mol %, and most preferably up to 6 mol %.

Furthermore, the comonomer content preferably is 0.1 mol % or more, more preferably is 1.0 mol % or more, and still more preferably is 2.0 mol % or more.

Preferably, the alpha olefin comonomer is a $C_{3-20}$, especially $C_{3-10}$, comonomers, particularly singly or multiply ethylenically unsaturated comonomers, in particular $C_{3-10}$ alpha-olefins such as propene, but-1-ene, hex-1-ene, oct-1-ene, 4-methyl-pent-1-ene etc. Preferably, but-1-ene, hex-1-ene and oct-1-ene are used. But-1-ene is an especially preferred comonomer.

Fraction (A) preferably is present in the polyethylene composition in an amount of from 1 to 15 wt %, more preferred from 2 to 10 wt %.

Furthermore, the density of fraction (A) preferably is 940 kg/m³ or less, more preferably is 935 kg/m³ or less, and most preferably is 930 kg/m³ or less.

In a preferred embodiment the polyethylene composition comprises (B) a first ethylene homo- or copolymer fraction, and
(C) a second ethylene homo- or copolymer fraction,
which are different from fraction (A), and wherein fraction (B) has a lower average molecular weight than fraction (C).

Usually, a polyethylene composition comprising at least two polyethylene fractions, which have been produced under different polymerisation conditions resulting in different (weight average) molecular weights and molecular weight distributions for the fractions, is referred to as "multimodal". Accordingly, in this sense the compositions of the invention are multimodal polyethylenes. The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

Preferably, the weight fraction of fraction (B) with regard to the total weight of fractions (B) and (C) is more than 40%.

Furthermore, preferably the weight fraction of fraction (B) with regard to the total weight of fractions (B) and (C) is less than 60%, more preferably is less than 57% and still more preferably is 54% or less.

In a preferred embodiment, the weight average molecular weight $M_w$ of fraction (A) relative to the $M_w$ of fractions (B) and (C) is higher by a factor of at least 2, more preferably at least 2.5. Preferably, the $M_w$ of fraction (A) relative to the $M_w$ of fractions (B) and (C) is higher by a factor of at most 6, more preferably of at most 5.

Fraction (B) preferably has an $MFR_2$ of 20 g/10 min or higher, more preferably of 50 g/10 min or higher, still more preferably of 100 g/10 min or higher, and most preferably of 200 g/10 min or higher.

Furthermore, fraction (B) preferably has an $MFR_2$ of 2000 g/10 min or lower, more preferably of 1500 g/10 min or lower and most preferably of 1000 g/10 min or lower.

Fractions (B) and (C) may both be ethylene copolymers or ethylene homopolymers, although preferably at least one of the fractions is an ethylene copolymer.

Preferably, the composition comprises an ethylene homopolymer and an ethylene copolymer component.

Preferably, fraction (B) is an ethylene homo- or copolymer with a density of at least 965 kg/m³.

Where one of the components is an ethylene homopolymer, this is preferably the component with the lower molecular weight, i.e. fraction (B).

Preferably, fraction (C) is an ethylene homo- or copolymer with a density of less than 965 kg/m³.

Most preferably, fraction (C) is a copolymer. It may be noted that the term ethylene copolymer is used herein to relate to a polyethylene deriving from ethylene and one or more copolymerisable comonomers. Preferably, the copolymer component(s) of the composition of the invention will contain at least 0.01 mol %, more preferably at least 0.05 mol %, and most preferably at least 0.1 mol % of non-ethylene comonomer units. Furthermore, preferably the copolymer contains at most 5 mol % of such comonomer units, more preferably at most 2 mol %.

Preferred ethylene copolymers employ alpha-olefins (e.g. $C_{3-12}$ alpha-olefins) as comonomers. Examples of suitable alpha-olefins include but-1-ene, hex-1-ene and oct-1-ene. But-1-ene is an especially preferred comonomer.

In a preferred embodiment the final polyethylene composition has a complex viscosity at 0.05 rad/s shear rate (eta$_{0.05}$) of 20,000 Pas or less, more preferably of 18,500 Pas or less, and most preferably of 15,000 Pas or less.

Preferably, the composition has a complex viscosity at 300 rad/s shear rate (eta$_{300}$) of 1,000 Pas or less, more preferably of 700 Pas or less.

Furthermore, the composition preferably has a SHI(1/100) of 5 or more, more preferably of 7 or more. Preferably, the composition has a SHI(1/100) of 25 or less, more preferably of 20 or less.

The density of the composition preferably is 940 kg/m³ or higher, more preferably is 945 kg/m³ or higher, still more preferably is 950 kg/m³ or higher, and most preferably is 960 kg/M³ or higher.

Preferably, the composition of the invention has a Charpy impact strength (23° C.) of 5 kJ/m² or more, still more preferably 7 kJ/m² or more and most preferably 10 kJ/m² or more.

Usually, the compositions have a Charpy impact strength (23° C.) of up to 40 kJ/m², more preferably up to 50 kJ/m².

Furthermore, preferably the compositions have a Charpy impact strength (−20° C.) of 3 kJ/m² or more, more preferably of 5 kJ/m².

Usually, the compositions have a Charpy impact strength (−20° C.) of up to 10 kJ/m², more preferably of up to 15 kJ/m².

Preferably, the composition has an E-modulus (tensile modulus) of 550 MPa or more, more preferably of 600 MPa or more, even more preferably of 800 MPa or more, and most preferably above 900 MPa.

Furthermore, the composition has a molecular weight distribution MWD ($M_w/M_n$) of higher than 5, more preferably higher than 10, and most preferably higher than 20.

The polyethylene composition may also contain minor quantities of additives such as pigments, nucleating agents, antistatic agents, fillers, antioxidants, processing aids, etc., generally in amounts of up to 10% by weight, preferably up to 5% by weight.

Fraction (A) of the polyethylene composition may be produced in any conventional ethylene homo- or copolymerisation method, e.g. in gas phase, slurry phase, liquid (bulk) phase using conventional reactors, such as loop reactor, gas phase reactor, semi-batch or batch reactor.

Preferably, component (A) is produced in a slurry reaction, preferably in a loop reactor, or in a gas phase reaction.

The polyethylene composition of the invention may be produced by blending fraction (A) with a polyethylene base resin, either mechanically, e.g. by in-line compounding, or in-situ.

By "in-situ blending", production of a multimodal polymer is meant wherein the fractions are produced either simultaneously in one reaction stage (e.g. by using two different catalysts), and/or are produced in a multistage process. A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymerisation reactions used in each stage may involve conventional ethylene homopolymerisation or copolymerisation reactions, e.g. gas-phase, slurry phase, liquid phase polymerisations, using conventional reactors, e.g. loop reactors, gas phase reactors, stirred tank reactors, batch reactors etc. (see for example WO97/44371 and WO96/18662).

In the preferred embodiment wherein the composition comprises fractions (A), (B) and (C), it is preferred that fractions (A), (B) and/or (C) are produced in a multistage reaction.

Further in that preferred embodiment, the composition is produced so that at least one of fractions (B) and (C), preferably (C), is produced in a gas-phase reaction.

Further preferred, one of the fractions (B) and (C) of the polyethylene composition, preferably fraction (B), is produced in a slurry reaction, preferably in a loop reactor, and one of the fractions (B) and (C), preferably fraction (C), is produced in a gas-phase reaction.

Accordingly, it is preferred that fractions (B) and (C) of the polyethylene resin are produced in different stages of a multistage process. Further, it is preferred that also fraction (A) is produced in a stage of said multistage process. However, it is also possible to add fraction (A) to (B) and (C) by in-line compounding.

Preferably, the multistage process comprises at least one gas phase stage in which, preferably, fraction (C) is produced.

It is also possible to produce components (A) and (C) or (A) and (B), preferably (A) and (C) in the same reaction stage, preferably in a gas phase reaction, by adding a second catalyst to said reaction stage with high Mw capability and appropriate comonomer incorporation capability.

Further preferred, fraction (C) is produced in a subsequent stage in the presence of fraction (B) which has been produced in a previous stage. Still further, it is preferred that fraction (A) is produced in a stage preceding the stages in which fraction (B) and (C) are produced. This means that if the final composition consists of fractions (A), (B) and (C), (A) is preferably made in the first stage.

It is previously known to produce multimodal, in particular bimodal, olefin polymers, such as multimodal polyethylene, in a multistage process comprising two or more reactors connected in series. As instance of this prior art, mention may be made of EP 517 868, which is hereby incorporated by way of reference in its entirety, including all its preferred embodiments as described therein, as a preferred multistage process for the production of the polyethylene resin.

The polymerisation catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst.

The Ziegler-Natta catalyst further preferably comprises a group 4 (group numbering according to new IUPAC system) metal compound, preferably titanium, magnesium dichloride and aluminium.

In the production of the resin, preferably a compounding step is applied, wherein the composition of the base resin, i.e. the blend, which is typically obtained as a base resin powder from the reactor, is extruded in an extruder and then pelletised to polymer pellets in a manner known in the art.

Optionally, additives or other polymer components can be added to the composition during the compounding step in the amount as described above. Preferably, the composition of the invention obtained from the reactor is compounded in the extruder together with additives in a manner known in the art.

The present invention further concerns an injection or compression moulded article comprising the polyethylene composition as described hereinbefore, a process for preparing the injection or compression moulded article which comprises injection or compression moulding of the composition into an article, and to the use of the polyethylene composition for injection or compression moulding.

EXPERIMENTAL AND EXAMPLES

1. Definitions and Measurement Methods a) Molecular Weight

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-4:2003. A waters 150 CV plus instrument was used with column 3× HT&E styragel from Waters (divinylbenzene) and trichlorobenzene (TCB) as solvent at 140° C. The column set was calibrated using universal calibration with narrow MWD PS standards (the Mark Howings constant K: $9.54*10^{-5}$ and a: 0.725 for PS, and K: $3.92*10^{-4}$ and a: 0.725 for PE). The ratio of $M_w$ and $M_n$ is a measure of the broadness of the distribution, since each is influenced by the opposite end of the "population".

b) Density

All densities are measured according to ISO 1183/D.

c) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5 kg ($MFR_5$) or 21.6 kg ($MFR_{21}$).

d) Shear Thinning Index SHI

Dynamic Theological measurements were carried out with a rheometer, namely Rheometrics RDA-II QC, on compression moulded samples under nitrogen atmosphere at 190° C. using 25 mm diameter plates and plate geometry 1.2 mm gap. The oscillatory shear experiments were done within the linear viscosity range of strain at frequencies from 0.05 to 300 rad/s (ISO 6721-1).

The values of storage modulus (G'), loss modulus (G") complex modulus (G*) and complex viscosity (eta*) were obtained as a function of frequency (omega). Eta(100 rad/s) is used as abbreviation for the complex viscosity at 100 rad/sec shear rate.

Shear thinning index (SHI), which is correlating with MWD and is independent of $M_w$, was calculated according to Heino ("Rheological characterization of polyethylene fractions" Heino, E. L., Lehtinen, A., Tanner J., Seppala, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.)

SHI value is obtained by calculating the complex viscosities $eta_{(1)}$ and $eta_{(100)}$ at a constant shear stress of 1 kPa and 100 kPa, respectively. The shear thinning index SHI(1/100) is defined as the ratio of the two viscosities $eta_{(1)}$ and $eta_{(100)}$.

The definitions and measurement conditions are also described in detail on page 8 line 29 to page 11, line 25 of WO 00/22040.

e) Charpy Impact Strength

Charpy impact strength was determined according to ISO 179:2000 on V-notched samples at 23° C. (Charpy impact strength (23° C.)) and −20° C. (Charpy impact strength (−20° C.)). The samples were produced by injection moulding.

f) ESCR

Environmental Stress Crack Resistance (ESCR) was determined in hours according to ASTM 1693, condition B, at 50° C. and using 10% Igepal co-630.

g) Stiffness

As a measure for the stiffness, the E-modulus (tensile modulus) of the compositions was measured on injection moulded samples according to ISO 527-2:1993. The modulus was measured at a speed of 1 mm/min.

h) Spiral Flow

Spiral Test is carried out using an Engel ES330/65 cc90 injection moulding apparatus with a spiral mould and pressure of 600, 1000 or 1400 bar screw diameter: 35 mm max. piston displacement: 150 cm³ spec. injection pressure: 600, 1000, or 1400 bar tool form: oval form; provided by Axxicon; thickness 2 mm, breadth: 5 mm temperature in pre-chamber and die: 230° C.

temperature in zone 2/zone 3/zone 4/zone 5: 230° C./230° C./225° C./200° C.

injection cycle: injection time including holding: 10 s cooling time: 15 s injection pressure: Follows from the predetermined length of the testing material.

dwell pressure=injection pressure screw speed: 30 rpm system pressure: 10 bar metering path: should be chosen so that the screw stops 20 mm before its final position at the end of the dwell pressure.

tool temperature: 40° C.

The spiral flow length can be determined immediately after the injection operation.

2. Polyethylene Compositions a) Ultra-High Molecular Weight Fractions (Fraction (A))

Ultra-high molecular weight (UHMW) ethylene polymers were prepared in the following manner:

Reactor: stainless steel reactor, 2 l and 17 l

Reactor medium: iso-Butane (900 ml, 8500 ml)

Inert gas: Nitrogen

Temperature: 85° C.

Comonomer: 1-Butene

Hydrogen addition: Batchwise

Ethylene feed: Batchwise and continuous

Comonomer addition: Batchwise and continuous

Al/Ti (mol/mol): 25

The polymerisations were carried out in a stainless steel reactor equipped with an anchor stirrer. The polymerisations were done in i-butane slurry at 85° C. at a total pressure of 22.2 bar (except for one test, as indicated in Table 1). For reactor size 2 l, 900 ml i-butane was used and for reactor size 17 l, 8500 ml i-butane was used.

As a catalyst, Lynx 200™, a $MgCl_2$ supported titanium containing catalyst available from Engelhard Corporation Pasadena, U.S.A.

TEAL was used as cocatalyst. An Al/Ti (mol/mol) ratio of 25 was used. The comonomer was 1-butene. Hydrogen was added as one batch at the outset of reaction. Ethylene was added continuously during the polymerisation to maintain a constant reactor pressure. 1-Butene was added both as a batch at the outset of reaction, and cascaded with ethylene during polymerisation.

After polymerisation was completed, the reactor was vented and the content was exposed to air.

The properties of these polymer are shown in Table 1.

TABLE 1

| | UHMW components | | | | | Polymerisation Conditions | | | | |
| | | | | | | | | | 1-butene | |
| Polymer | $M_w$ | $M_n$ | MWD | Butene wt.-% | Density | T/° C. | p/bar | $H_2$/bar | (wt % vs. ethyl.) | 1-butene batch/g |
| --- | --- | --- | --- | --- | --- | --- | --- | --- | --- | --- |
| A1 | 440.000 | 65.000 | 6.8 | 6.6 | 914 | 85 | 22.2 | 0.05 | 5 | 292 |
| A2 | 420.000 | 100.000 | 4.2 | 3.4 | 925 | 85 | 23.8 | 0.15 | 3 | 21 |
| A3 | 420.000 | 70.000 | 6 | 4.1 | 923.6 | 85 | 22.2 | 0.15 | 7 | 20 |
| A4 | 720.000 | 85.000 | 8.5 | 6 | 915 | 85 | 22.2 | 0 | 5 | 292 | b) Compositions

In Examples 2 to 5, 5 wt % of UHMW polymers, A1 to A4, respectively, were mechanically blended with a reference bimodal polyethylene base resin (Example 1). The reference bimodal resin has been prepared in accordance with EP 1 187 876, in particular with the examples described therein. The split between high and low molecular weight fraction (fractions (B) and (C)) was 50/50.

Blends were compounded on a small scale twin-screw Prism 24 mm extruder two times with a melt temperature of 190 to 230° C. (logged process data). 1000 ppm of Irganox B561 was added to the blends.

Furthermore, for comparison, the properties of a commercial bimodal polyethylene composition without an UHMW fraction and a commercial unimodal polyethylene composition are given as Comparative Examples 6 and 7, respectively, in Table 2.

The properties of the obtained compositions are given in Table 2.

The invention claimed is:

1. A multimodal polyethylene composition wherein
(i) the composition has an $MFR_2$ of 0.05 to 100 g/10 min, and
(ii) the environmental stress crack resistance ESCR measured in hours according to ASTM 1693, condition B and E-modulus EM measured according to ISO 527-2: 1993 in MPa satisfy the following relation:

$$ESCR \geq -EMh/MPa + 1150h$$

and wherein the composition comprises:
(A) a fraction of a copolymer of ethylene with one or more alpha-olefins, with a weight average molecular weight $M_w$ of 300,000 g/mol or more;
(B) a first ethylene homo- or copolymer fraction; and
(C) a second ethylene homo-or copolymer fraction;
wherein fraction (A) is present in the composition in an amount of from 1 to 20 wt %;
wherein fraction (B) has a lower average molecular weight than fraction (C).

2. A polyethylene composition according to claim 1, wherein the Charpy impact strength CIS (23° C.) measured in kJ/m² according to ISO 179:2000 and the $MFR_2$ in g/10 min satisfy the following relation:

$$CIS \geq -12 \log(MFR_2/g/10min)kJ/m^2 + 21.6 kJ/m^2.$$

TABLE 2

| | Ex. 1 Reference (B + C) "Bimodal" | Ex. 2 Ref. + 5 wt % A1 | Ex. 3 Ref + 5 wt % A2 | Ex. 4 Ref + 5 wt % A3 | Ex. 5 Ref + 5 wt % A4 | Comparative Ex. 6 Bimodal commercial PE | Comparative Ex. 7 Unimodal commercial PE |
| --- | --- | --- | --- | --- | --- | --- | --- |
| MFR2 | 1.3 | 0.93 | 0.91 | 0.9 | 0.73 | 3.5 | 0.78 |
| density | 956.2 | 955.4 | 952.9 | 953.5 | 952.5 | 953 | 951.4 |
| MWD | 18 | | | | | 14 | 8.3 |
| Mw (kD) | 145 | | | | | 115 | 140 |
| Processability | | | | | | | |
| spiral length 600 bar (cm) | 27.8 | | 25.6 | 25.9 | 25 | 31.6 | |
| spiral length 1000 bar (cm) | 40.8 | | 38.8 | 38.8 | 38.5 | 45.6 | |
| spiral length 1400 bar (cm) | 54.4 | | 50.9 | 50.9 | 50.6 | | |
| SHI 1/100 | 9.7 | 10 | 9.8 | 9.8 | 13 | 6.7 | 9.5 |
| eta0.05 | 10235 | 13354 | 13868 | 13773 | 18188 | 4410 | |
| eta300 | 525 | 571 | 590 | 587 | 592 | 441 | |
| Mechanical properties | | | | | | | |
| Charpy +23° C. (kJ/m2) | 17.5 | 29.1 | 28 | 27 | 22 | 8.6 | |
| Charpy −20° C. (kJ/m2) | 8.4 | 12.1 | 12 | 12 | 11 | 6.7 | |
| Bell (h) | 230 | 530 | 390 | 470 | 710 | 60 | 12 |
| E-modulus (MPa) | 850 | 785 | 820 | 830 | 845 | 870 | |
| Relations in claims | | | | | | | |
| EM + 1150 | 300 | 365 | 330 | 320 | 305 | 280 | |
| 12 log MFR2 + 21.6 | 20.2 | 22.0 | 22.1 | 22.1 | 19.8 | 16.2 | 22.9 |
| 0.5 FA + 39 | 18.6 | — | 19.6 | 19.6 | 19.8 | 16.2 | |

3. A polyethylene composition according to claim 1, wherein the Charpy impact strength CIS (23° C.) measured in kJ/m² according to ISO 179:2000 and the flowability (FA) measured in terms of the spiral length in cm at a pressure of 1000 bar satisfy the following relation:

$$CIS \geq -0.5 FA kJ/m^2/cm + 39 kJ/m^2.$$

4. A polyethylene composition according to claim 1 wherein fraction (A) has a $M_w$ of 320,000 to 1,000,000 g/mol.

5. A polyethylene composition according to claim 1 wherein the comonomer content of fraction (A) is from 1 to 15 mol %.

6. A polyethylene composition according to wherein fraction (A) has a density of 940 kg/m³ or less.

7. A polyethylene composition according to claim 1 wherein the $M_w$ of fraction (A) is higher than the $M_w$ of fractions (B) and (C) by a factor of from 2 to 6.

8. A polyethylene composition according to claim 1 wherein fractions (A), (B) or (C) are produced in a multistage reaction.

9. A polyethylene composition according to claim 1 wherein the composition has a density of 940 kg/m³ or higher.

10. An injection or compression moulded article comprising the polyethylene composition according to claim 1.

11. A process for preparing an injection or compression moulded article according to claim 10 wherein the process comprises injection or compression moulding the polyethylene composition into an article.

12. A polyethylene composition according to claim 1 adapted for injection or compression moulding.

13. A polyethylene composition according to claim 2, wherein the Charpy impact strength CIS (23° C.) measured in kJ/m² according to ISO 179:2000 and the flowability (FA) measured in terms of the spiral length in cm at a pressure of 1000 bar satisfy the following relation:

$$CIS \geq -0.5 FA \text{kJ/m}^2/\text{cm} + 39 \text{kJ/m}^2.$$

14. A polyethylene composition according to claim 4 wherein the comonomer content of fraction (A) is from 1 to 15 mol %.

15. A polyethylene composition according to claim 1, wherein the composition has an $MFR_2$ of 1.0 to 100 g/10 min and the ESCR is at least 150 h.

* * * * *